United States Patent
Jordan et al.

(10) Patent No.: US 10,243,372 B2
(45) Date of Patent: Mar. 26, 2019

(54) ADJUSTMENT OF INDUSTRIAL INSTALLATION

(75) Inventors: Lars Jordan, Poing (DE); Steffen Lamparter, Feldkirchen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 463 days.

(21) Appl. No.: 14/126,920

(22) PCT Filed: Aug. 2, 2012

(86) PCT No.: PCT/EP2012/065165
§ 371 (c)(1),
(2), (4) Date: Feb. 10, 2014

(87) PCT Pub. No.: WO2013/026673
PCT Pub. Date: Feb. 28, 2013

(65) Prior Publication Data
US 2014/0188297 A1    Jul. 3, 2014

(30) Foreign Application Priority Data
Aug. 25, 2011    (DE) .................. 10 2011 081 547

(51) Int. Cl.
*B23Q 15/12*    (2006.01)
*H02J 4/00*    (2006.01)
(Continued)

(52) U.S. Cl.
CPC ................ *H02J 4/00* (2013.01); *G06Q 10/06* (2013.01); *G06Q 10/08* (2013.01); *Y02E 40/76* (2013.01);
(Continued)

(58) Field of Classification Search
CPC ............ G05B 15/02; G05B 2219/2642; G05B 13/021; G05B 2219/32021; G05B 13/028;
(Continued)

(56) References Cited

U.S. PATENT DOCUMENTS 4,279,013 A * 7/1981 Cameron ............ G05B 19/4163
318/561
5,148,370 A * 9/1992 Litt ...................... G05B 13/028
700/104

(Continued)

FOREIGN PATENT DOCUMENTS

DE    10056494 A1    5/2002
DE    602004012399 T2    11/2008
(Continued)

OTHER PUBLICATIONS

Notice from the European Patent Office dated Oct. 1, 2007 concerning business methods. Official Journal of the European Patent Office, vol. 30, No. 11, pp. 592-593.
(Continued)

*Primary Examiner* — Darrin D Dunn
(74) *Attorney, Agent, or Firm* — Harness, Dickey & Pierce, P.L.C.

(57) ABSTRACT

It is proposed that an industrial installation, be operated with the power consumption being optimized for a target function. The target function may also factor in further parameters, with the result that multitarget optimization, for example, can be performed and the installation can be adapted in respect of the power consumption or the power consumption can be adapted in respect of the installation. Both the industrial installation and an energy supplier or network operator provide information which can be factored in as appropriate for the purpose of optimization or as part of the target function. It is advantageous that overload situations are avoided and a large number of regenerative (Continued)

energy sources can be used as energy suppliers, because adaptation is effected in line with the amount of energy actually provided. Hence the power supply system can be operated and loaded as appropriate.

22 Claims, 2 Drawing Sheets

(51) Int. Cl.
  *G06Q 10/06* (2012.01)
  *G06Q 10/08* (2012.01)
(52) U.S. Cl.
  CPC .............. *Y02P 90/14* (2015.11); *Y02P 90/18* (2015.11); *Y02P 90/20* (2015.11); *Y04S 10/54* (2013.01); *Y04S 10/545* (2013.01); *Y04S 10/56* (2013.01); *Y04S 10/60* (2013.01)
(58) Field of Classification Search
  CPC ........ G05B 19/41865; G05B 19/41875; G05B 23/0235; G05B 23/0294; G06Q 10/063
  See application file for complete search history.

(56) References Cited

U.S. PATENT DOCUMENTS

| | | | | |
|---|---|---|---|---|
| 5,315,521 A * | 5/1994 | Hanson | B01J 19/0033 | 700/103 |
| 5,550,744 A * | 8/1996 | Steinbichler | B29C 45/76 | 264/40.1 |
| 7,010,373 B2 * | 3/2006 | Fukushima | G06Q 10/06 | 700/100 |
| 7,873,429 B2 * | 1/2011 | Boutemy | G06Q 10/06 | 700/106 |
| 8,417,360 B2 * | 4/2013 | Sustaeta | G05B 13/024 | 700/28 |
| 8,447,423 B2 * | 5/2013 | Budiman | G05B 19/41875 | 700/100 |
| 8,510,122 B2 * | 8/2013 | Althen | G06Q 10/06375 | 700/177 |
| 8,554,381 B2 * | 10/2013 | Bischof | G05B 23/0243 | 700/286 |
| 8,635,096 B2 * | 1/2014 | Schuh | G06Q 50/06 | 705/7.11 |
| 8,886,361 B1 * | 11/2014 | Harmon | G06Q 10/04 | 700/291 |
| 8,938,314 B2 * | 1/2015 | Krause | G05B 15/02 | 700/108 |
| 9,129,231 B2 * | 9/2015 | Kaufman | G06Q 10/04 | |
| 9,785,126 B2 * | 10/2017 | Kaufman | G05B 13/048 | |
| 2002/0169646 A1 * | 11/2002 | Casserly | G06Q 10/06 | 700/99 |
| 2003/0050738 A1 * | 3/2003 | Masticola | G06Q 10/06 | 700/291 |
| 2003/0061004 A1 * | 3/2003 | Discenzo | G05B 13/024 | 702/182 |
| 2004/0068352 A1 * | 4/2004 | Anderson | A01B 69/008 | 701/25 |
| 2004/0119608 A1 * | 6/2004 | Rao | H04Q 9/00 | 340/870.01 |
| 2004/0225413 A1 * | 11/2004 | Miyashita | H02J 3/00 | 700/291 |
| 2005/0015283 A1 * | 1/2005 | Iino | G06Q 10/06315 | 705/4 |
| 2005/0165511 A1 * | 7/2005 | Fairlie | F17D 1/04 | 700/286 |
| 2006/0190113 A1 * | 8/2006 | Boutemy | G06Q 10/06 | 700/97 |
| 2007/0032911 A1 | 2/2007 | Clesle | | |
| 2007/0143074 A1 | 6/2007 | Castagnoli | | |
| 2009/0088907 A1 * | 4/2009 | Lewis | G01D 4/002 | 700/286 |
| 2009/0177505 A1 * | 7/2009 | Dietrich | G06Q 10/06375 | 705/7.37 |
| 2009/0204245 A1 * | 8/2009 | Sustaeta | G05B 13/024 | 700/99 |
| 2009/0204267 A1 * | 8/2009 | Sustaeta | G05B 13/0285 | 700/291 |
| 2009/0210081 A1 * | 8/2009 | Sustaeta | G05B 13/0285 | 700/99 |
| 2010/0168897 A1 * | 7/2010 | August | G05B 19/042 | 700/105 |
| 2010/0274377 A1 * | 10/2010 | Kaufman | G06Q 10/06 | 700/103 |
| 2010/0274602 A1 * | 10/2010 | Kaufman | G06Q 10/04 | 705/7.38 |
| 2010/0274612 A1 * | 10/2010 | Walker | G05B 19/41865 | 705/7.11 |
| 2010/0275147 A1 * | 10/2010 | Kaufman | G06Q 30/0202 | 715/771 |
| 2011/0055036 A1 * | 3/2011 | Helfan | G06Q 30/04 | 705/26.1 |
| 2011/0125340 A1 * | 5/2011 | Kirchner | F03D 7/0284 | 700/293 |
| 2011/0130857 A1 * | 6/2011 | Budiman | G05B 19/41875 | 700/104 |
| 2011/0307109 A1 * | 12/2011 | Sri-Jayantha | G06Q 10/04 | 700/291 |
| 2012/0010757 A1 * | 1/2012 | Francino | G05B 15/02 | 700/291 |
| 2012/0010758 A1 * | 1/2012 | Francino | G05B 17/02 | 700/291 |
| 2012/0109392 A1 * | 5/2012 | Hanks | H02J 3/008 | 700/291 |
| 2012/0123600 A1 * | 5/2012 | Krause | G05B 15/02 | 700/286 |
| 2012/0158603 A1 * | 6/2012 | Ameling | G06Q 10/06 | 705/317 |
| 2012/0239167 A1 * | 9/2012 | Carrette | G05B 19/41865 | 700/52 |
| 2012/0245754 A1 * | 9/2012 | Mehnert | G05B 15/02 | 700/297 |
| 2012/0290104 A1 * | 11/2012 | Holt | G06Q 10/00 | 700/29 |
| 2012/0323382 A1 * | 12/2012 | Kamel | G05F 1/66 | 700/286 |
| 2014/0180492 A1 * | 6/2014 | Graf | G05B 19/41865 | 700/297 |
| 2014/0214220 A1 * | 7/2014 | Kamel | G05F 1/66 | 700/291 |
| 2014/0257586 A1 * | 9/2014 | Pai | G05B 15/02 | 700/291 |
| 2014/0336961 A1 * | 11/2014 | Landgraf | G01R 21/00 | 702/62 |

FOREIGN PATENT DOCUMENTS

| | | |
|---|---|---|
| DE | 102009010117 A1 | 9/2010 |
| EP | 1338120 A2 | 8/2003 |
| EP | 1748529 B1 | 8/2008 |
| WO | WO 2002041569 A2 | 5/2002 |

OTHER PUBLICATIONS

International Search Report and Written Opinion dated Oct. 18, 2012.
Maintaining Knowledge About Temporal Intervals; Allen, Communications of the ACM 26(11): 832-843 (1983).
"EPCIS—Electronic Product Code Information Services" in Wikipedia under http.//de.wikipedia.org/wiki/EPCIS am Aug. 18, 2011 erhältlich.
"Smart Grid" in Wikipedia under http://de.wikipedia.org/wiki/Smart_Grid am Aug. 18, 2011 erhältlich.
"Supply-Chain-Management" in Wikipedia under http://de.wikipedia.org/wiki/Supply-Chain-Management am Aug. 18, 2011 erhältlich.
"Enterprise Resource Planning" in Wikipedia under http://de.wikipedia.org/wiki/Enterprise_Resource_Planning am Aug. 18, 2011 erhältlich.

(56) References Cited

OTHER PUBLICATIONS

"Manufactoring Execution System" in Wikipedia under http://de.wikipedia.org/wiki/Manufacturing_Execution_System am Aug. 18, 2011 erhältlich.
"RFID" in Wikipedia under http://de.wikipedia.org/wiki/RFID am Aug. 18, 2011 erhältlich.
"RFID-based Automotive Network" available on Aug. 18, 2011 on the Internet under www.autoran.de.
International Search Report PCT/ISA/210 for PCT/EP2012/065165 dated Oct. 18, 2012.
Written Opinion PCT/ISA/237 for PCT/EP2012/065165 dated Oct. 18, 2012.
German Office Action for German priority patent publication No. DE 10 2011 081 547.3 dated Jun. 25, 2012.

\* cited by examiner

1:   for all r ∈ R carry out
2:       EPC/EPCClassID e = lookupEPC(r.p)
3:       add ObjectEvent (e, r.t, r.m, ., ., "REQUIRED"), .)
4.       if e ∉ L then
5:           if e type EPC then
6:               register SimpleEventQuery{MATCH_anyEPC(e)}
7:           if E type EPCClassID then
8:               register SimpleEventQuery{MATCH_EPCClass (e)}
9:       L = L ∪ {e}

FIG 4

ADJUSTMENT OF INDUSTRIAL INSTALLATION

PRIORITY STATEMENT

This application is the national phase under 35 U.S.C. § 371 of PCT International Application No. PCT/EP2012/065165 which has an International filing date of Aug. 2, 2012, which designated the United States of America and which claims priority to German patent application number DE 10 2011 081 547.3 filed Aug. 25, 2011, the entire contents of each of which are hereby incorporated herein by reference.

FIELD

At least one embodiment of the invention generally relates to a method and/or a device for adjusting an industrial installation. In particular, at least one embodiment of the invention enables an efficient use of smart grids or an advantageous use of production or logistics management systems.

BACKGROUND

EPCIS (Electronic Product Code Information Services) is a standard that was published in its first version in 2007 and essentially defines interfaces for the registration and retrieval of so-called EPCIS events. EPCIS enables users (companies, authorities, supply chains, etc.) to increase transparency and control of their respective sequences. EPCIS can be used not only within one company but also between companies (see: http://de.wikipedia.org/wiki/EPCIS).

The term intelligent power network (also referred to here as smart grid) includes the communicative networking and control of power generators, storage devices, electric consumers and network equipment in energy transmission and distribution networks of the electricity supply. This type of networking enables an optimization and monitoring of the connected components. The aim here is to safeguard the energy supply on the basis of an efficient and reliable system operation (see: http://de.wikipedia.org/wiki/Smart_Grid).

The increasing expansion of renewable energies and the resulting rise in fluctuating, uncontrollable and therefore unpredictable power feeds into an energy supply network (also referred to as a power network) jeopardizes the security of supply and network stability. A corresponding expansion of the energy supply network is frequently neither feasible in a timely manner nor advisable from an economic point of view. For this reason, alternative strategies for an efficient use of the power network are increasingly proposed.

One possibility for configuring network use more efficiently is the introduction of additional information technology (IT) in the power network; a power network of this type is often referred to as an "intelligent power network" or "smart grid".

On the basis of an IT infrastructure of this type, coordination mechanisms can be used to increase network utilization and/or network stability. However, the development of suitable coordination mechanisms is not yet available and the corresponding concepts are in most cases expensive to implement, since a new infrastructure is required for coordination and control of consumers.

A further disadvantage is that the known coordination mechanisms are used for devices which are simple to control, such as air-conditioning systems or heating pumps.

A coordination of large consumers such as industrial installations is significantly more complex and requires different and, if necessary, more complex coordination mechanisms.

SUMMARY

At least one embodiment of the invention is directed to providing a possibility for efficient control of an industrial or technical installation, for example through optimization of the power consumption or the costs for the power consumption.

Preferred embodiments can be found, in particular, in the dependent claims.

In at least one embodiment, a method is proposed for adjusting an industrial installation,
  in which a power consumption of the industrial installation is defined,
  in which an optimization of the power consumption of the industrial installation in respect of a target function is carried out,
  in which the industrial installation is adjusted according to the optimization.

The aforementioned object is also achieved by a device for adjusting an industrial installation comprising a processing unit, which is configured in such a way that:
  a power consumption of the industrial installation is definable,
  an optimization of the power consumption of the industrial installation in respect of a target function is practicable,
  the industrial installation is adjustable according to the optimization.

At least one embodiment is directed to a computer program product which is directly loadable into a memory of a digital computer, comprising program code parts which are suitable for carrying out steps of embodiments of the method described here.

Furthermore, at least one embodiment is directed to a computer-readable storage medium, e.g. any given storage device, comprising instructions (e.g. in the form of program code) executable by a computer which are suitable so that the computer carries out steps of the method described here.

DETAILED DESCRIPTION OF THE EXAMPLE EMBODIMENTS

In at least one embodiment, a method is proposed for adjusting an industrial installation,
  in which a power consumption of the industrial installation is defined, in which an optimization of the power consumption of the industrial installation in respect of a target function is carried out, in which the industrial installation is adjusted according to the optimization.

For example, the power consumption of the industrial installation can be adjusted according to the optimization. It is also possible for the industrial installation itself, e.g. a processing speed and/or processing modes, to be adjusted according to the optimization.

The method proposed here thus enables, for example, an energy-optimized production planning and control for industrial installations, e.g. production installations, logistics installations, etc., on the basis of existing logistics or production-logistics systems.

The power supply can advantageously be considered along the lines of a just-in-time or just-in-sequence delivery of supply parts in manufacturing companies and the production control systems can be extended accordingly for the implementation of supply-demand effects in a smart grid.

This means, for example, that a single system can be used for the procurement of materials (e.g. raw/ancillary material) or goods for production and for the procurement of the energy required for the production sequences.

It is advantageous here, for example, that, due to the existing logistics or production-logistics systems, no additional information systems are required by the energy consumer (manufacturing company) and lower costs are therefore incurred for the introduction of smart grid solutions.

It is furthermore advantageous that the energy costs can be reduced for the energy consumer through flexible adaptation of the installation, e.g. production, to external events (e.g. price signals), for example through energy-optimized job control or machine configuration.

It is also advantageous that energy suppliers (e.g. energy network operators) are given an additional flexibility, since the required energy can be controlled via events. An inefficient network expansion, which is required in rare cases only, is thereby avoided. Furthermore, the proportion of fluctuating energy suppliers (e.g. regenerative energy suppliers) can be increased.

In a further development, the target function takes into account information relating to past power consumptions.

In particular, historical data can be collected and can be taken into account within the optimization. This has the advantage that, for example, a forecast can be made on the basis of the historical data. It is thus possible to predict a result, e.g. a delayed completion of a product or a corresponding modification of the power consumption of the industrial installation, and instigate suitable countermeasures in a timely manner.

In a different further development, the target function takes into account information from an energy supplier, in particular a signal relating to the power consumption.

In a particular further development, the information from the energy supplier comprises at least one of the following information elements:

a signal relating to the minimum and/or maximum power consumption to be set;
price information;
other tariff information;
utilization information.

Also in a further development, the target function takes into account information relating to the power network, in particular a status of the power network.

This information relating to the power network can be defined by the industrial installation or another measuring unit.

Moreover, in a further development, the target function takes into account a present, a past and/or a planned power consumption of the industrial installation.

In an additional further development, the optimization of the power consumption and of at least one further parameter of the industrial installation is carried out in respect of the target function.

In a next further development, the at least one further parameter comprises:

a parameter of the industrial installation;
a processing time;
costs for the installation;
costs for the power;
a logistics plan;
a production plan.

In one design, the target function takes into account a present or future situation of the industrial installation.

The future situation may be a forecast situation of the industrial installation.

In an alternative embodiment, the present or future situation of the industrial installation takes into account at least one of the following information elements:

a delivery status of delivered or provided goods;
a configuration status of the industrial installation;
an operating mode of the industrial installation.

In a next design, the target function comprises at least one of the following targets:

fulfillment of a delivery commitment;
fulfillment of a predefined machine utilization;
fulfillment of a predefined energy consumption;
fulfillment of a throughput.

The target function may be a cost function, in particular a weighted cost function. The target function can be optimized in respect of one target or in respect of a plurality of targets (single-target or multi-target optimization).

Also in one design, the industrial installation comprises at least one of the following components:

a production or manufacture;
a logistics unit;
a service provision unit;
a data center;
an energy supplier;
a transmission network operator.

The industrial installation may in particular be any installation which requires power in a significant quantity for the energy supplier. The industrial installation may, for example, comprise one or more companies.

The aforementioned object is also achieved by a device for adjusting an industrial installation comprising a processing unit, which is configured in such a way that:

a power consumption of the industrial installation is definable,
an optimization of the power consumption of the industrial installation in respect of a target function is practicable,
the industrial installation is adjustable according to the optimization.

The processing unit specified here may, in particular, be designed as a processor unit and/or an at least partially hard-wired or logical circuit arrangement, which is, for example, configured in such a way that the method as described herein can be carried out. The processing unit may be or may comprise any type of processor or calculator or computer with correspondingly necessary peripherals (memories, input/output interfaces, input/output devices, etc.).

The above explanations relating to embodiments of the method apply accordingly to embodiments of the device. The device can be designed in one component or may be distributed in a plurality of components.

In one further development, the device is part of a production management system.

At least one embodiment is directed to a system comprising at least one of the devices described here.

At least one embodiment is directed to a computer program product which is directly loadable into a memory of a digital computer, comprising program code parts which are suitable for carrying out steps of embodiments of the method described here.

Furthermore, at least one embodiment is directed to a computer-readable storage medium, e.g. any given storage device, comprising instructions (e.g. in the form of program code) executable by a computer which are suitable so that the computer carries out steps of the method described here.

The characteristics, features and advantages of this invention described above, and also the manner in which these are achieved, become clearer and more readily understandable in conjunction with the following schematic description of example embodiments, which are explained in detail in conjunction with the drawings. For the sake of clarity, similar or similarly acting elements can be provided with the same reference numbers.

The approach proposed here enables an energy consumption of a complex system, e.g. a manufacturing company or a service provider, to be influenced in such a way that utilization and/or stability of the energy network can be improved.

This is advantageously achieved in that goods logistics or supply chain management solutions for a just-in-time (JIT) or just-in-sequence (JIS) delivery, processing and/or control can be used accordingly.

The effect or trend whereby real-time events are incorporated into the production-logistics systems for the JIT/JIS delivery strategies can advantageously be used here.

Existing systems (e.g. production-logistics systems) can thus often respond to external events in that the scheduling and/or control of the production and logistics processes is/are adapted. Systems of this type are, for example:
  Supply Chain Management (SCM),
  Enterprise Resource Planning (ERP) and/or
  Manufacturing Execution System (MES).

To explain the aforementioned concepts, reference is also made to [http://.de.wikipedia.org/wiki/Supply-Chain-Management], [http://.de.wikipedia.org/wiki/Enterprise_Resource_Planning] and [http://.de.wikipedia.org/wiki/Manufacturing_Execution_System].

For example, a smart grid can provide dynamic price signals. Price changes can be used as events in order to achieve an energy-optimized scheduling or an energy-optimized control of the power consumption.

In particular, manufacturing companies play an important role in the introduction of the smart grid concept due to their typically high energy consumption (and their resulting substantial impact on the power network).

Through the use of existing IT infrastructures of the JIT/JIS logistics control, a relatively low-cost solution can be realized for the implementation of a "demand-response" scenario in or for the smart grid.

Figure 1:
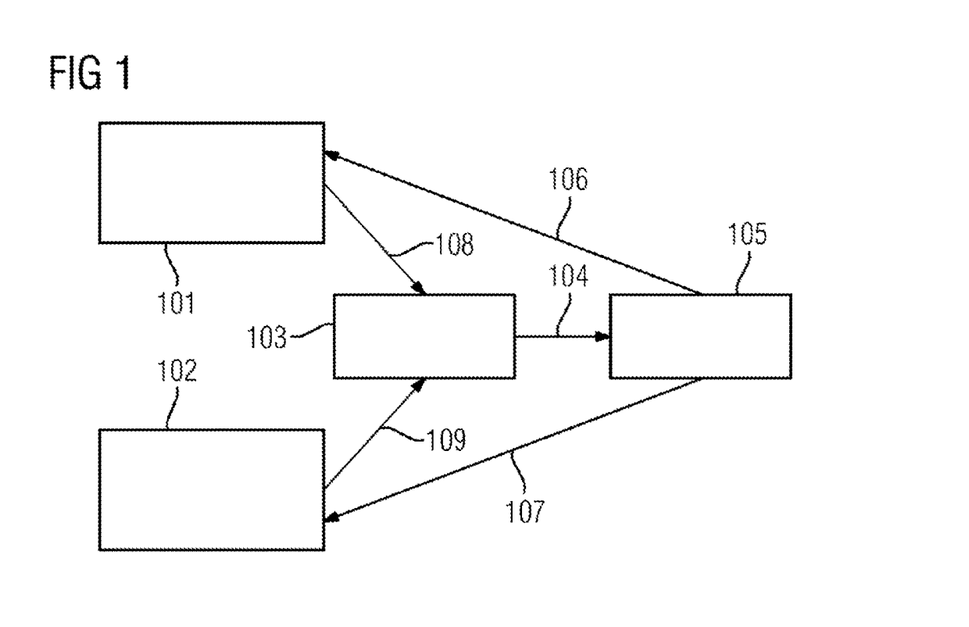
FIG. 1 shows a manufacturing company as a consumer of energy from an energy supplier.

FIG. 1 shows a manufacturing company 101 as a consumer of a considerable quantity of energy from an energy supplier 102.

Both the company 101 and the energy supplier 102 provide an event server 103 with information 108, 109 which is processed by an assistance system 105 as control events 104. The assistance system 105 comprises, for example, at least one of the aforementioned systems: SCM, ERP, MES.

The company 101 provides the event server 103, for example, with delivery information, status information relating to delivery or the like as information 108. The energy supplier 102 provides the event server 103, for example, with price information, supply-demand information or energy consumption plans or changes to the same as information 109.

For example, in a JIT delivery following an order, which is already performed early, a delivery call-off or daily call-off takes place (e.g. according to VDA 4905/4915/4916), which is discharged promptly on demand and defines the required quantity and time. The corresponding IT systems (ERP/SCM/MES) in the assistance system 105 can, for example, respond flexibly to different delivery quantities or different delivery times (e.g. by rescheduling). The assistance system 105 provides the company 101 accordingly with feedback 106 relating to e.g. the order and/or delivery call-off.

If the company 101 is, for example, a major customer of the energy supplier 102, a long-term delivery contract (according to the ordering of goods) may exist, which defines short-term schedule forecasts relating to the required power quantity on the day before (according to a delivery call-off for goods)—cf. information 107, which is provided by the assistance system 105 to the energy supplier 102.

A smart grid can advantageously have the function that, depending on the status of the power network and the energy production forecasts, the possible consumption is controlled not only via a flexible power price (event message) but also via a corresponding supply-demand signal which, for example, is regulated in a contract.

Further Advantages and Implementations:

For example, the approach proposed here enables existing logistics and/or production-logistics systems, in particular of manufacturing industries, to be incorporated at low cost into a smart grid. (Dynamic) price signals and supply-demand strategies, for example, can be used here to obtain power efficiently from the energy supplier.

Two possible scenarios are explained below as examples:
(1) For example, logistics events can be exchanged, e.g. in a company and/or between companies, in order to enable an event-based exchange of energy information (e.g. power price changes, energy requirement changes, schedule changes, etc.).
   An existing (e.g. RFID-based) monitoring system (also referred to as a tracking and tracing system), which is, where appropriate, even already available, e.g. for supply chains, and can be used for the purposes of the present invention, can be employed for this purpose.
   An information model is preferably extended by events (e.g. through extension of the EPCIS standard) which are required for the control of the power supply. This may entail, for example, price signals or supply-demand signals (cf. information 109).
(2) An existing (e.g. production-logistics) assistance system 105 can be extended so that it receives e.g. power provision events (e.g. transferred in the form of information 109) and influences the production planning (and therefore the power consumption) according to requirements (cf. feedback 106 to companies 101).

The approach thus makes it possible to respond to logistics events (information 108) and also energy information 109 and to optimize the power consumption or power costs on the basis of energy models of the industrial installation concerned (i.e. the company 101) through:
- a rescheduling of production (e.g. a production job rescheduling),
- a change to the production sequences (e.g. modification of the speed of production) and/or
- a dynamic changeover of the power provider and/or power tariff.

In particular, the approach proposed here can pursue at least one of the following goals:
(a) A total energy consumption or a consumption of non-regenerative energy can be minimized. For example, jobs can be rescheduled in times in which a large amount of wind energy or solar energy is available.
(b) Load peaks can be reduced or avoided. This has, in particular, the advantage that a lower capacity of the electrical lines suffices.
(c) A flexible response can be made to an actually present and deliverable quantity of electric power. In particular, additional or reduced amounts of electric power can be at least partially equalized in respect of an energy schedule.
(d) A prompt changeover between power providers and/or power tariffs can increase cost efficiency.

For example, an RFID-based production-logistics system can be optimized in the manner described here. RFID enables the automatic identification and localization of objects and thus simplifies the input of data (cf. http://de.wikipedia.org./wiki/RFID).

The RAN research project (www.autoran.de) can be referred to here as an example, in which a logistics system with an RFID-based monitoring (tracking and tracing system) of objects and the corresponding production-logistics assistance system for energy-based production planning and control is used.

Any given production-logistics infrastructure can be used for the energy-optimal scheduling and control of a manufacturing operation. A suitable response can be made here to events of the power supplier (e.g. price change), distribution network operator (e.g. overload message), etc.

The energy suppliers (energy management), e.g. network operators, power wholesalers, transmission network operators, distribution network operators, metering point operators, can supply different energy-related events, e.g. an overload event, a tariff change event, a consumption status event etc. to the event server, which then transfers a control event to the assistance system.

On the side of the companies, different energy consumers can take part which transfer different information (e.g. events, e.g. EPCIS events) to the event server. These are also transferred to the assistance system in the form of control events.

The assistance system thus obtains not only information, e.g. relating to the procurement of goods or raw material for production, but also information relating to the procurement of the required energy.

The assistance system may be designed here as distributed, e.g. a plurality of assistance systems may be disposed in the energy consumers (companies), so that the control events are transmitted to at least one assistance system.

EPCIS

The EPCIS standard is used below as an example and a data exchange based on the EPCIS standard is described.

The functionality of the EPCIS standard is extended here as an example in order to be able, for example, to confirm plans and also to determine deviations from plans.

According to the current standard, an EPCIS event describes which object (what?) has been observed at which place (where?), at what time (when?), for what reason (why?).

This concept can be extended or used to represent events with delivered energy, such as, for example, an overload event, tariff change event, or consumption status event. It can thus be expressed, for example, that a corresponding tariff (what?) changes at a specific time (when?), for a specific location segment (where?), or for a specific reason (why?).

This enables a registration and notification of problems which occur, for example, along a production line (e.g. a supply chain). The XML-based EPCIS event syntax is based on formal semantics. The present solution suggests in particular to deduce implicit knowledge from events, as a result of which situations and compensation strategies can be derived substantially more efficiently.

In respect of the EPCIS events and master ontologies, reference is made to the IEC 61512 and IEC 62264 standards.

Logical predicates are used in an ontology to express classes (predicates with an arity of one) and relations between classes (predicates with an arity of two). Statements thus have the form $C(x)$ or $R(x, y)$, where C designates a class, R a relation and x, y specific objects.

Classes thus represent event types, whereas characteristics represent event fields.

For example, the statements
ObjectEvent(e1),
Assembly(p1), and
bizStep(e1, p1)
express that an EPCIS event ObjectEvent e1 has been observed within a step bizStep p1, which is of the Assembly type.

Alternatively, an EPCIS QuantityEvent could be used to describe the available power amount at the step bizstep of the Assembly type. The epcClass type can refer here to a "power" resource.

The operators $\forall$, $\exists$ and the logical operations $\vee$, $\wedge$ $\rightarrow$, etc. can be used to indicate complex class descriptions.

For example, it can be expressed through the following formula that each individual which is an ObjectEvent event and has a step bizStep which belongs to the Assembly class is also an event of a ReceivedInAssembly class:

$$\text{ReceivedInAssembly}(x) \leftarrow \text{ObjectEvent}(x) \wedge \wedge \exists y \cdot (\text{Assembly}(y) \wedge \text{bizStep}(x,y))$$

New events ObjectEvent x which satisfy this condition are automatically classified as ReceivedInAssembly events. All rules for situation recognition and for compensation which are defined for ReceivedInAssembly events of this type are automatically applied to the new events.

The number of rules for situation recognition and compensation can thus be reduced. This has a positive effect on the specification and fault tolerance. The situation recognition and compensation explained below can be implemented using the EPCIS event ontology or the latter can be extended accordingly.

Event Processor

Figure 2:
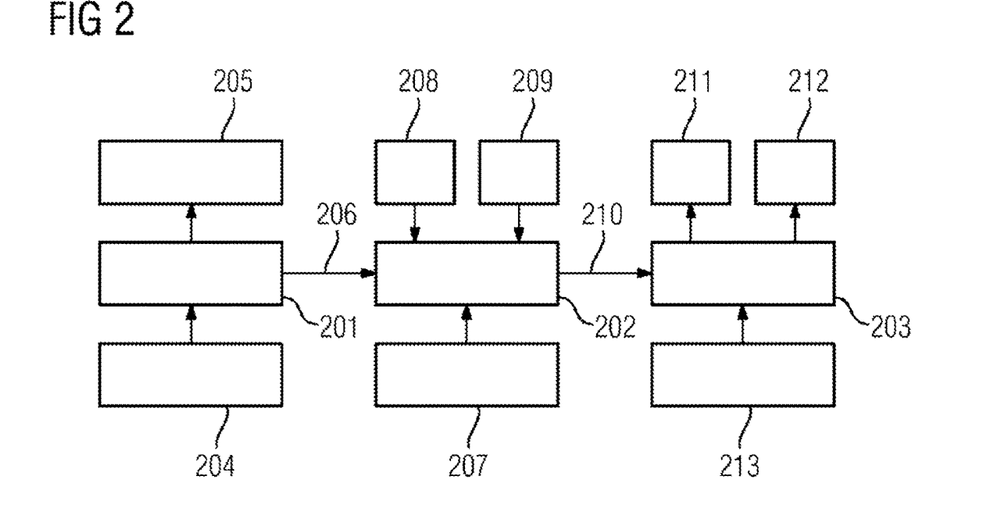
FIG. 2 shows an event processor as part of the assistance system shown in FIG. 1, wherein the event processor comprises a registration, a situation recognition and a compensation.

An event processor can be designed as part of the assistance system 105. The event processor can respond to the control events 104 which are based on the information 108 or 109, i.e. on information or events from the companies 101 or the energy supplier 102. Along with events which originate, for example, from production, the event processor can also take into account energy-related events in a corresponding manner, and scheduling can be adapted on the basis of these input parameters. For example, it can be established by the event processor that a power price has changed by more than x % from a default value, which can result in e.g. production being adjusted and/or the power supplier being changed. The following designs take account in particular of the information 108 from the company 101 and the feedback 106 to the company 101. Accordingly, it is possible to take into account the information 109 from the energy supplier 102 for the optimization and/or to generate the feedback 107 to the energy supply 102 as a result of the optimization.

It should be noted here that the company 101 may comprise at least a company or at least a technical installation. Accordingly, the energy supplier 102 may comprise a multiplicity of energy suppliers. The feedback 107 may also relate to a selection of an energy supplier.

The aim of the event processor is, for example, to recognize critical situations which are based, for example, on events provided with a timestamp, current production sequence scheduling, expected inventories or other events of the energy supplier. As a result of a recognition of this type, suitable countermeasures can be instigated, e.g. a rescheduling and/or output of further events, e.g. so-called EPCIS events. FIG. 2 shows an example of an event processor which comprises the following components or provides corresponding functionalities:

a registration 201,
a situation recognition 202,
a compensation 203.

These components and functionalities are explained below.

Registration 201

The registration 201 receives and analyses a production plan 204 which, for example, has been provided by the industrial installation (e.g. the company 101) in order to register itself for relevant events. The registration 201 updates (cf. arrow 206) the plan data in the situation recognition 202.

The production plan 204 specifies the resources (e.g. energy requirement, material and end products) which are required at a predefined time. For example, the production plan 204

$$R \subseteq P \times M \times \mathbb{R} \times T$$

corresponds to a set of tuples (p, m, q, t) which describe a material consumption, where p∈P describes a resource recognition (e.g. material according to a parts list),
m∈M describes a machine recognition or a machine location, and
q∈$\mathbb{R}$ describes a quantity of a resource p, which is required at the time t∈T.

Accordingly, energy-related information 109 can also be registered by the energy supplier 102 and taken into account.

Figure 3:
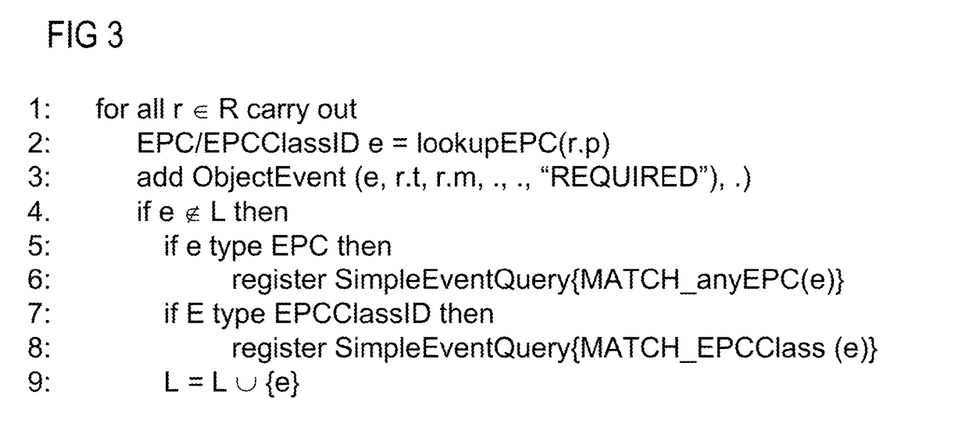
FIG. 3 shows an algorithm which describes how queries are reported to an event mechanism of an EPCIS database and how the required availabilities of the resources are provided to the situation recognition.

FIG. 3 shows an algorithm which describes how queries are reported to an event mechanism of an EPCIS database and how the required availabilities of the resources are provided to the situation recognition 202.

As an example, terms from object-oriented programming are used here to establish a relationship with elements of a vector. Thus, an expression x·a characterizes components a of a vector $$x \in X = \{(a,b,c) | a \in A \wedge b \in B \wedge c \in C\}.$$

The algorithm shown in FIG. 3 designates a method for registering relevant EPCIS events in an EPCIS database 205 and for updating availability plans (cf. arrow 206). A resource consumption plan R and an observation list L are made available as input parameters.

The algorithm maintains an observation list L, which contains product codes (EPCs) or class identifiers EPC-ClassIDs of those resources which are already registered. A function for integrating logistics information into product sequences represents a mapping of the internal identifier which is used for the different resource classes in the Manufacturing Bill of Materials (MBOM) onto the external identifiers which are used in the EPCIS tracking and tracing system. This mapping is implemented in line 2 of the algorithm using a so-called lookupEPC method. In the production environment, a class-based identification of materials, for example, can be used in order to obtain production flexibility, since a parts-based tracking and tracing identification is used, particularly in the case of just-in-time (JIT) or just-in-sequence (JIS) processes.

Different designs of the lookupEPC method can be used to cover different scenarios. The difference between internal and external identifiers can be addressed by means of explicit mappings of EPCClass/EPC identifiers onto MBOM (class) identifiers. Based on the structure of the identifier, the class identifier can be derived in many cases directly from the part identifier. For example, the EPC class urn:epc:idpat:sgtin:0614141.112345.* of the part with the EPC urn:epc:idpat:sgtin:0614141.112345.400 is defined by the first part of the EPC.

As soon as the external EPC or the associated class (EPCClass) has been identified, the algorithm verifies whether a corresponding recall query is already registered in the EPCIS database (line 4). If not, a new query is registered (lines 6 and 8). The EPCIS standard provides a set of predefined queries (SimpleEventQueries), which are implemented by EPCIS databases.

Since the situation recognition 202 often compares an actual sequence behavior with the expected sequence behavior, plans for material availability are updated accordingly. Updates of this type may, for example, be presented locally, in that an ObjectEvent with a "REQUIRED" action is added to the ontology (line 3).

For a predefined resource r∈R, the event specifies a time r·t when a material r·p must be available at a location r·m. For the sake of compactness, the following abbreviation is used to establish a reference to the ObjectEvent in the EPCIS event ontology:

$$ObjectEvent(e, t, l, s, b, a, d) \Leftrightarrow ObjectEvent(e) \wedge \wedge$$
$$timestamp(e, t) \wedge location(e, l) \wedge \wedge bizStep(e, s) \wedge$$
$$businessTransaction(e, b) \wedge \wedge action(e, a) \wedge disposition(e, d)$$

where

"timestamp" comprises or designates a time or time information,
"location" comprises or designates a location or location information,
"bizStep" comprises or designates a step, e.g. of the production installation or the supply chain, "businessTransaction" comprises or designates a transaction, "action" comprises or designates an action, and "disposition" comprises or designates status information.

While the identifier e and the timestamp t can be used for all events, the other specified relations are optional. Properties which are not defined can be denoted in the form of a wildcard ".".

Situation Recognition 202

Situations such as an early provision or delayed delivery of supply parts, machinery failures or other faults are explained below as examples. Each fault is registered or described e.g. by means of at least one observed event.

The situation recognition 202 can also take account accordingly of faults, situations or events which are based on information 109 from the energy supplier 102.

In this respect, a description of situations 207 can be used by the situation recognition 202.

In the event processing, a situation can be defined by dependency relationships between events using event patterns. Event patterns can be regarded as templates which match specific combinations of events. A rule-based event pattern language is used here as an example; a rule-based approach has the advantage that a logical formalism for "reasoning" can be combined via event hierarchies with additional language constructions and temporal reasoning.

An event pattern is constructed from atomic or complex events and extends the logical formalism as follows:

$$P::=pr(t_1, \ldots ,t_n)|P \text{ WHERE } t|q|(P) \cdot q$$

$$|P \text{ BIN } P|\text{NOT}(P) \cdot [P,P] \quad (1)$$

where pr represents an n-array predicate with any given expressions $t_1, \ldots t_n$, $q \in \mathbb{R}$ is a non-negative rational number, WHERE can be used to define restrictions which use an expression t, and BIN is a binary operator which refers to one of the temporal relationships which are defined, for example, in [Allen, J. F. (1983). Maintaining knowledge about temporal intervals. Commun. ACM, 26(11), 832-843].

These temporal operators comprise

SEQ, which represents a sequence of events,

AND, which indicates that two events take place at the same time, and

OR, which specifies that at least one of the two events must take place.

In the present scenario, the predicate pr usually assumes an (atomic) EPCIS event, e.g. an ObjectEvent.

Situations can be treated as complex events, i.e.

$$pr(t_1, \ldots t_n) \leftarrow p.$$

Particularly in the case of distributed production networks, three types can generally be distinguished for registering deviations:

(a) the deviation is compared by comparing the actual resource provision (event 209), which is tracked by the EPCIS database, with the local plans of the companies, (b) the company receives a deviation notification, e.g. via an EPCIS interpretation event 208, or (c) actual object tracking information from the EPCIS database is compared locally with information of the expected resource provision which is defined by means of forecast algorithms.

The three approaches are illustrated using the following event patterns according to rule (2) to rule (4). They determine whether incoming resources or outgoing products with a unique identifier e are to be delayed according to the planned availabilities and delivery periods.

$$\text{ActualDelay}(e) \wedge \text{delay}(e,t_2,t_1) \leftarrow (\text{ObjectEvent}(e,t_2,l,\bullet,\bullet,\text{"REQUIRED"},\bullet)\text{SEQ ObjectEvent}(e,t_2,l,\bullet,\bullet,\text{"OBSERVED"},\bullet)) \quad (2)$$

$$\text{NotifiedDelay}(e) \wedge \text{delay}(e,t_2,t_1) \leftarrow (\text{ObjectEvent}(e,t_2,l,\bullet,\bullet,\text{"REQUIRED"},\bullet)\text{SEQ ObjectEvent}(e,t_1,l,\bullet,\bullet\text{"DEVIATION"},\bullet)) \quad (3)$$

$$\text{ExpectedDelay}(e) \wedge \text{delay}(e,t_2,t) \leftarrow (\text{ObjectEvent}(e,t_2,t_2,\bullet,\bullet,\text{"REQUIRED"},\bullet) \wedge \text{ObjectEvent}(e,t_1,t_1,\bullet,\bullet,\text{"OBSERVED"},\bullet) \wedge \text{deliveryEstimation}(t_3,l_1,l_2) \wedge t=t_1+t_3) \quad (4)$$

WHERE $t_2 < t_1 + t_3$

The rules operate accordingly for the energy, e.g. with so-called QuantityEvents (comprising one class with one type).

Rule (2) implements the first approach by comparing the time t1 at which a resource was observed at a predefined location 1 with the time t2 at which a resource is required at the location according to the production plan. However, it is normally too late for an appropriate response if the delay is detected following receipt of the delivery. Here, an inter-organizational tracking and tracing system offers, for example, two alternatives for an early registration. Rule (3) replaces the actual observation with a deviation event and thus implements the second approach. Finally, rule (4) uses historical tracking and tracing data from the EPCIS database to determine an approximate delivery time based on the currently available observations.

In the example, the forecast function $$\text{deliveryEstimation}: L \times L \rightarrow T$$

enables an estimate of the arrival time $t \in T$ based on the current position and the destination of a specific goods item. Possible implementations can take into account average delivery periods of previous orders, forecast models, neural networks and/or simulation models.

Generally, time delays in delivery chains are only one possible situation which is of interest for production planning and control. On the basis of the proposed approach, other (critical) situations, e.g. quantity deviations, misroutings, etc. can also be registered, e.g. by means of the EPCIS event representation and/or the event pattern language. Furthermore, it is possible to verify a consistency of defined situations on the basis of the formal semantics of events.

Ultimately, the situation recognition 202 thus provides a recognized critical situation 210 to the compensation 203 for further processing.

Compensation 203

As soon as the critical situation 210 has been registered, notifications and, if necessary, suitable compensation measures can be initiated. The compensation 203 preferably uses a set of compensation strategies 213 for this purpose. These compensation strategies 213 can be converted by means of compensation rules into suitable responses, e.g. EPCIS events 211 or an updating of the scheduling 212. An action can be carried out in the form of feedback from the assistance system 105 to the company 101 and/or the energy supplier 102.

The compensation rules have the form $$\text{comp} \leftarrow P$$

where

P is a situation description according to equation (1), and comp is at least a predicate of the rule engine or comprises a linking of a plurality of predicates of this type.

Since the number of compensation rules can become very large (several thousand of such compensation rules are quite possible), a compact and precise language or description is preferably required. The logic-based model used as an example supports this requirement, since event hierarchies are used to define rules at different levels of abstraction, which significantly reduces the number of required rules. In addition, the formal model employed can be used for a consistency check of the compensation strategies.

A compensation performance strategy for registered delays of a supply chain can serve as an example. The logical reasoning mechanism automatically provides the information that the situations ActualDelay, NotifiedDelay and ExpectedDelay, which were registered in the situation recognition 202, are all sub-classes of the Delay situation. This is guaranteed by the following definition:

$$\text{Delay}(x) \leftarrow \text{ObjectEvent}(x) \wedge \text{delay}(x,y) \quad (5)$$

In the case of electric power, the "ObjectEvent" can be denoted as "QuantityEvent".

On the basis of this equation (5), it is possible to define a general (and clear) compensation rule for all types of delay as follows:

$$\text{notifyScheduler}(\text{"time"}, p, t_1, t_2) \leftarrow \text{delay}(e, t_1, t_2) \wedge \text{lookupEPC}^{-1}(e, p) \quad (6)$$

As soon as a delay has been registered, the rule triggers the built-in predicate "notifyScheduler", which invokes the updating process of the production time control. This process supports updates of resource availability in terms of time and also quantity and a change of the production due date of a product.

For a notification of delays, the predicate also uses the resource identifier p (e.g. according to MBOM), the expected time t1 and the observed/estimated time t2. In order to map the external EPCIS identifier e onto the internal MBOM identifier p, the inverse function of the previously explained lookupEPC method is used.

In the following section, it is shown how the production sequence scheduling responds to the plan updating triggered by events.

Reactive Production Sequence Scheduling

The production sequence scheduler is similarly part of the assistance system 105 and defines the detailed production sequence schedule. The following aspects, for example, can be taken into account here:
(i) The decision is taken into account regarding which task should be carried out by means of a specific machine (detailed machine sequence scheduling).
(ii) The resource supply (stock-oriented sequence scheduling) can also be taken into account, which is particularly susceptible to logistics events (particularly in JIT/JIS scenarios).

The effects of EPCIS events on stock-oriented sequence scheduling are taken into account below as an example.

A detailed machine sequence scheduling with modifications over time can be integrated accordingly into the model.

Reactive Sequence Scheduling Algorithm

The aim of the proposed reactive production sequence scheduling approach is to calculate the cost-minimizing sequence of production jobs JP when the event processor updates resource provision plans or production periods.

Production jobs require a set of sampling jobs JW from a stock. Stocks are replenished by delivery jobs JD. The available energy can also be regarded as stock.

Figure 4:
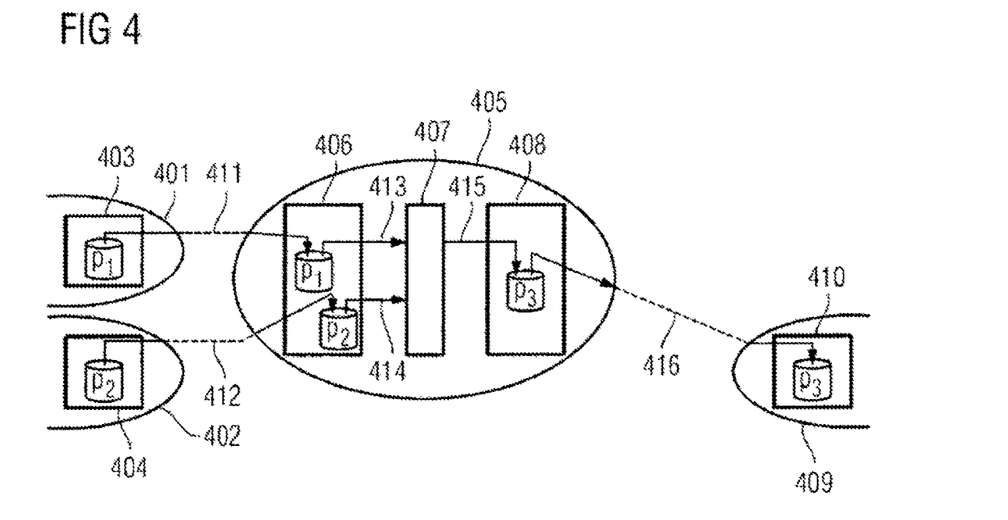
FIG. 4 shows a schematic diagram illustrating the dependencies between production jobs, sampling jobs and delivery jobs.

FIG. 4 shows a schematic diagram illustrating the dependencies between production jobs, sampling jobs and delivery jobs.

FIG. 4 thus shows an excerpt from a production chain with a plurality of production nodes 401, 402, 405 and 409. Each production node has at least one stock or inventory 401, 402, 406, 408 and 410. A product p1 is transferred from the inventory 403 of the production node 401 by means of a resource provision job 411 into the inventory 406 of the production node 405. A product p2 is transferred accordingly from the inventory 404 of the production node 402 by means of a delivery job 412 into the inventory 406 of the production node 405. By means of a sampling job 413 and a sampling job 414, the products p1 and p2 are removed from the inventory 406 and are processed by means of a production 407 into a product p3; the product p3 is stored in an inventory 408 by means of a production job 415. The product p3 can be transferred accordingly by means of a further delivery job 416 into the inventory 410 of the adjoining production node 409.

A production job $j \in JP$ is a 3-tuple $j=(p, d, s)$ in which $p \in P$ is the MBOM material class identifier of the end product and $d \in \mathbb{N}$ is the due date, wherein both are derived from the production jobs which are received e.g. via a production manager. An optimum start time $s \in \mathbb{N}$ of the production job is calculated e.g. by a production sequence scheduler. As soon as a function $$\text{notifyScheduler}(\text{"duedate"}, p, t_1, t_2)$$

with the parameters ("duedate", $p, t_1, t_2$) is invoked by the event processor, the production jobs are updated as follows:

$$J^P = J^P \setminus (p, t_1, s)$$

and $$J^P = J^P \cup (p, t_2, s)$$

Updates can essentially trigger the rescheduling algorithm explained below.

Each production job requires a (non-empty) set of resources (products, materials, etc.) from stocks. A production sequence scheduling therefore requires information on resource provisions JD. It is described by the tuples (p,q,t), where $p \in P$ designates the MBOM identifier, $q \in \mathbb{N}$ the quantity and $t \in \mathbb{N}$ the delivery date.

During the sequence scheduling, the set of delivery jobs JD is used to verify whether a set of sampling jobs or consumption jobs is possible at a predefined time. The set of resource provision jobs is updated by way of the and $$\text{notifyScheduler}(\text{"quantity"}, p, t_1, t_2)$$

und $$\text{notifyScheduler}(\text{"time"}, p, t_1, t_2)$$

methods, according to the above description for the production jobs.

The sampling jobs which are required for a specific production job can be defined by means of the function $$\text{mobm}: P \to 2^{P \times \mathbb{Z}^-}$$

on the basis of which the quantity of each resource required for a specific product is specified. The total set of sampling jobs for the $p_{end} \in P$ product is defined by $$J_{p_{end}}^W = \{(p,q,t) \mid (p,q) \in \text{mobm}(p_{end}) \wedge t \in \mathbb{N}\},$$

where t defines the sampling time of the resources for the product $j_{end}$ and depends on the sequence schedule of the production jobs, see equation (9).

Rescheduling Algorithm:

The rescheduling algorithm can define an optimum or optimized sequence schedule of the production jobs which are contained in JP.

A sequence schedule therefore defines a starting point j·s for all j∈JP. A sequence schedule is thus a total function $\sigma: J^P \rightarrow \mathbb{N}$ which allocates a start time to each job.

The aim of the selection of the function σ lies in a minimization of a cost function. The cost function may comprise different cost categories. An earliness or delay, which is defined by the distance to a due date $$|\sigma(j) - j \cdot d|$$

or a required quantity of a resource (e.g. energy) can serve as examples.

A change is made to the sequence schedule σold only if a significant improvement is thereby achieved. In order to define the improvement quantitatively, the distance between the optimum and the present sequence schedule is calculated using an edit distance function.

This edit function is preferably dependent on the stock system. For example, in the case of a high-bay warehouse, any given exchange between production jobs can take place; in this case, the edit function can be implemented using the Hamming distance. Thus, the optimization problem for selecting a most suitable sequence schedule can be formulated as follows:

$$\arg\min_{\sigma: J^P \rightarrow \mathbb{N}} w \cdot \sum_{j \in J^P} |\sigma(j) - j \cdot d| + (1 - w) \cdot \text{edit}(\sigma, \sigma_{old}) \qquad (7)$$

where w∈[0,1] represents a "rescheduling threshold value" (w=1 always selects the optimum sequence schedule, whereas w=0 results in the sequence schedule with minimal changes).

Different alternatives of a one-dimensional or multi-dimensional optimization problem can essentially be formulated. Different approaches, e.g. optimization of a cost function, search for a Pareto optimum solution, etc., can be used for the solution.

In order to ensure that no production jobs are planned without
  sufficient stocks or resources,
  enough time to transport components from the warehouse to the machines, and
  adequate production capacity being available, The following restrictions, for example, apply according to formulae (8) to (10). A prep function defines the transport time for predefined sampling and production jobs, a PROD_CAPACITY constant defines how many production jobs can be run in parallel.

$$\forall t \in \mathbb{N}, \qquad (8)$$

$$\forall p \in P: \sum_{i=0}^{t} \sum_{j \in J^D \cup J_p^W \wedge j \cdot t = t \wedge j \cdot p = p} j \cdot q \geq 0$$

$$\forall j \in J^P, \qquad (9)$$

$$\forall j' \in J_{j,p}^W: j' \cdot t - \text{prep}(j', j) = j \cdot s$$

$$\forall t \in T: \; |\{j \in J^P | j \cdot s = t\}| \leq \text{PROD\_CAPACITY} \qquad (10)$$

Equation (8) takes into account that adequate resources are available, equation (9) takes into account that the time for transportation is sufficient, and equation (10) ensures that production capacity is sufficient.

The optimization problem can be represented as a mixed integral linear program with a completely unimodular restriction matrix. The problem can thus be efficiently solved using a simplex algorithm.

Thus, it is proposed in particular to operate an industrial installation, e.g. a production or logistics system, in an optimized manner, wherein the power consumption is optimized in respect of a target function. As well as the power consumption, the target function may also take into account further parameters, e.g. of an energy supplier or of the installation itself, so that e.g. a multi-target optimization can be carried out and the installation can be adapted in respect of the power consumption or the power consumption in respect of the installation. Both the industrial installation and an energy supplier provide information which can be taken into account accordingly for the optimization or as part of the target function. It is advantageous here that overload situations are avoided and, in particular, a large number of regenerative energy sources can be used as energy suppliers, since an adaptation to the actually provided energy quantity takes place and the power network can thus be operated or utilized accordingly. The invention can be used, for example in smart grids or in production or logistics management systems.

Although the invention has been illustrated and described in greater detail by the at least one example embodiment shown, the invention is not restricted thereto and other variations can be derived herefrom by the person skilled in the art without leaving the protective scope of the invention.

ABBREVIATIONS

EPC Electronic Product Code
EPCIS Electronic Product Code Information Services
ERP Enterprise Resource Planning
IT Information Technology
JIS Just-In-Sequence
JIT Just-In-Time
MBOM Manufacturing Bill of Materials
MES Manufacturing Execution System
RFID Radio-Frequency Identification
SCM Supply Chain Management

The invention claimed is:

1. A method for adjusting an industrial installation, the method comprising:
  analyzing a production plan for the industrial installation, the production plan specifying quantities of resources required by the industrial installation to be available at particular machines or locations at particular dates or times for consumption during production according to a current production sequence schedule;
  analyzing incoming events, including one or more production-logistics related events and one or more energy related events, to identify a present critical situation or predict a future critical situation based on an extended event ontology describing critical situations associated with unexpected deviations from the analyzed production plan according to defined temporal dependency relationships between events using rule-based event patterns matching specific combinations of events;

optimizing at least one of power consumption or costs of the power consumption of the industrial installation by initiating, in response to the identified present critical situation or the predicted future critical situation, compensation measures for the industrial installation, the compensation measures being based on compensation rules, which are determined based on sets of compensation strategies for the industrial installation; and dynamically controlling machinery at the industrial installation by applying the compensation measures such that a delay-minimizing and energy-optimal production sequence schedule is maintained while limiting a number of changes to the current production sequence schedule according to a rescheduling algorithm comprising an edit distance function and a rescheduling threshold value.

2. The method of claim 1, wherein the optimizing takes into account one or more energy related events relating to past power consumption.

3. The method of claim 1, wherein the optimizing takes into account one or more energy related events received from an energy supplier.

4. The method of claim 3, wherein the one or more energy related events received from the energy supplier comprises at least one of:
a signal relating to at least one of minimum and maximum power consumption to be set;
price information;
other tariff information; or
utilization information.

5. The method of claim 1, wherein the optimizing takes into account one or more energy related events relating to a power network.

6. The method of claim 1, wherein the optimizing takes into account one or more energy related events relating to at least one of a present, a past or a planned power consumption of the industrial installation.

7. The method of claim 1, further comprising:
optimizing at least one further parameter of the industrial installation.

8. The method of claim 7, wherein the at least one further parameter comprises at least one of:
a parameter of the industrial installation;
a processing time;
costs for the industrial installation;
costs for the power consumption;
a logistics plan; or
a production plan.

9. The method of claim 1, wherein the incoming events include situations, which further include a present or future situation of the industrial installation.

10. The method of claim 9, wherein the present or future situation of the industrial installation takes into account at least one of:
a delivery status of delivered or provided goods;
a configuration status of the industrial installation; or
an operating mode of the industrial installation.

11. The method of claim 1, wherein the incoming events include at least one of:
fulfillment of a delivery commitment;
fulfillment of a threshold machine utilization;
fulfillment of a threshold energy consumption; or
fulfillment of a throughput.

12. The method of claim 1, wherein the industrial installation comprises at least one of:
a production or manufacture;
a logistics unit;
a service provision unit;
a data center;
an energy supplier; or
a transmission network operator.

13. The method of claim 3, wherein the optimizing takes into account one or more energy related events relating to the power consumption.

14. The method of claim 5, wherein the optimizing takes into account one or more energy related events relating to a status of the power network.

15. The method of claim 1, wherein
the one or more production-logistics related events include faults;
the identifying identifies the faults taking into account the analyzed production plan; and
the optimizing optimizes the power consumption of the industrial installation by initiating the compensation measures in response to the identified faults for the industrial installation.

16. The method of claim 1, wherein the incoming events include at least one of faults, situations, or an event occurrence.

17. A device for adjusting an industrial installation, the device comprising:
at least one memory that stores computer-readable instructions; and
at least one processor that executes the computer-readable instructions to implement a registration component, a situation recognition component, a compensation handling component, and a production sequence scheduler component, wherein
the registration component analyzes a production plan for the industrial installation, the production plan specifying quantities of resources required by the industrial installation to be available at particular machines or locations at particular dates or times for consumption during production according to a current production sequence schedule,
the situation recognition component analyzes incoming events, including one or more production-logistics related events and one or more energy related events, to identify a present critical situation or predict a future critical situation based on an extended event ontology describing critical situations associated with unexpected deviations from the analyzed production plan according to defined temporal dependency relationships between events using rule-based event patterns matching specific combinations of events,
the compensation handling component optimizes at least one of power consumption or costs of the power consumption of the industrial installation by initiating, in response to the identified present critical situation or the predicted future critical situation, compensation measures for the industrial installation, the compensation measures being based on compensation rules, which are determined based on sets of compensation strategies for the industrial installation, and
the production sequence scheduler component dynamically controls machinery at the industrial installation by applying the compensation measures such that a delay-minimizing and energy-optimal production sequence schedule is maintained while limiting a number of changes to the current production sequence schedule according to a rescheduling algorithm comprising an edit distance function and a rescheduling threshold value.

18. A production management system comprising the device of claim 17.

19. A system comprising the device of claim 17.

20. A system comprising the production management system of claim 18.

21. The device of claim 17, wherein
the one or more production-logistics related events include faults; and
the at least one processor further executes the computer-readable instructions to
identify the faults taking into account the analyzed production plan; and
optimize the power consumption of the industrial installation by initiating the compensation measures in response to the identified faults for the industrial installation.

22. The device of claim 17, wherein the incoming events include at least one of faults, situations, or an event occurrence.

* * * * *